Patented Sept. 23, 1947

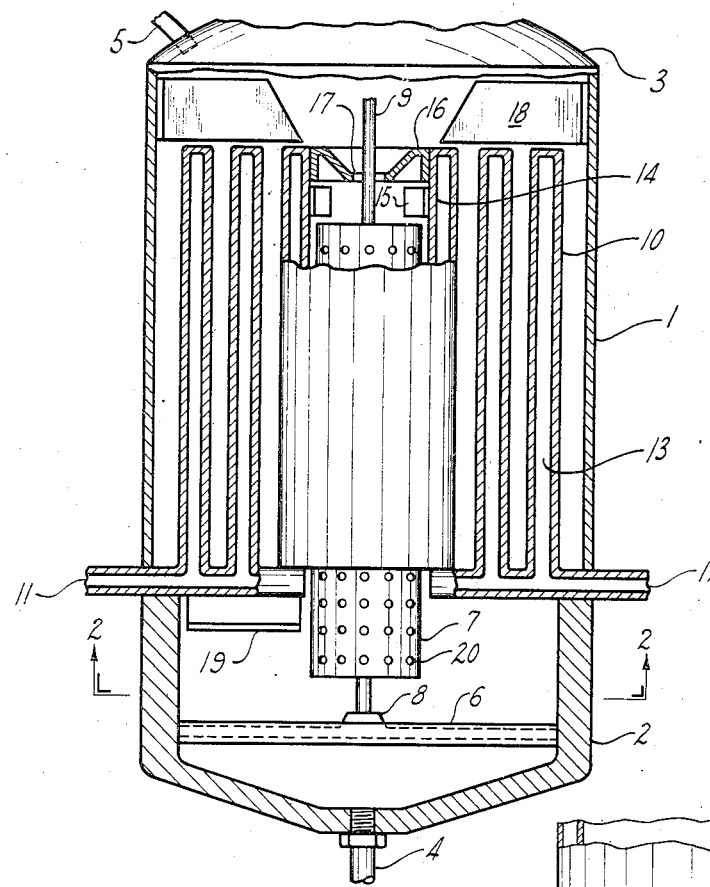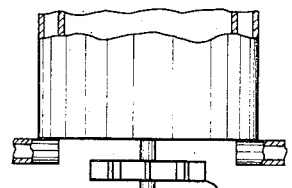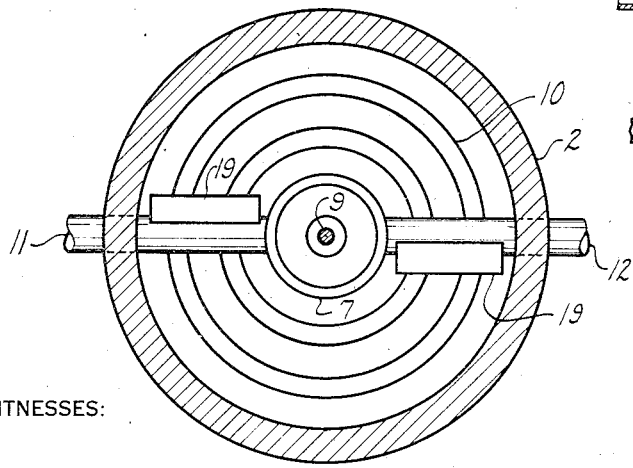

2,427,776

UNITED STATES PATENT OFFICE 2,427,776

EVAPORATOR

Bronislaw Goldman, Pittsburgh, Pa.

Application February 8, 1945, Serial No. 576,824

7 Claims. (Cl. 159—25)

This invention relates to new and useful improvements in evaporators or the like of the type for effecting rapid evaporation for concentration of liquids, and it is among the objects thereof to provide evaporators in which the liquid is subjected to a steady continuous mixing action while exposed to heating or cooling walls with a strong circulatory motion and a minimum input of power. The present invention is a continuation-in-part of an application serially numbered 389,101, filed April 18, 1941.

The invention will become more apparent from a consideration of the accompanying drawing constituting a part hereof, in which Fig. 1 is a vertical cross-sectional view of an evaporator embodying the principles of this invention;

Fig. 2 a cross-sectional view thereof taken along the line 2—2 of Fig. 1; and

Fig. 3 a detail of a portion of the central well with a modified form of impeller.

In the drawing, the numeral 1 generally designates a container in the form of a cylindrical housing having a base 2 and a cover 3 with a drain or outlet 4 at the base and an inlet 5 in the cover thereof. A transverse strut 6 is provided in the base for supporting a cylindrical rotor 7 which is mounted on an end bearing 8 and is provided with a drive shaft 9 that may be driven by a motor (not shown) mounted on the cover member 3. Disposed within the housing 1 above the base 2 are a plurality of partition walls 10 forming continuous annular passages connected at 11 and 12 to conduits leading to a source of heating or cooling medium, hot water or cooling liquid, as the case may be, to maintain circulation of such temperature controlling medium through the annular chambers 13 formed by the partition walls. Instead of the walls 10, any suitable heat exchange surface may be employed.

Disposed centrally of the housing 1 is a well 14 having radially extending baffles 15, the top of the well having an inverted cup-shaped end 16 with a central opening 17 for the passage of liquid into the well, as will be hereinafter explained. Baffles 18 are provided at the top of housing 1 above the partition walls 10 and baffles 19 are provided below the heat exchange walls as shown. The cylindrical rotor 7 may be provided with perforations 20 but will also function with an imperforate surface.

In operation, assuming the container 1 to be filled with a liquid up to the top of the heat exchange walls 10, operation of the cylindrical rotor 7 will set up circulation of the liquid through the perforation 20 against the inner wall of the well 14, the centrifugal force causing displacement of the liquid through the cylinder 7 and around the heat exchange walls 10, the circulation being normal to the direction of the rising vapors. The rising liquid will strike baffles 18 and be forced radially inwardly through openings 17 into the hollow rotor 7.

The liquid rising inside of the well by the centrifugal action of the cylindrical rotor will strike baffles 15 and be cascaded into the cylindrical rotor from which it again flows downwardly to the bottom of the container. Without the baffles 15 there would not be any directed circulation of the liquid within the well 14, but by means of the end wall 16 and the baffles 15 the flow is diverted downwardly and the volume of liquid displacement in the base of the container is added through the top opening 17 of the well by direction of the baffles 18.

The bottom baffles 19 aid in the upward directional movement of the liquid, although this function may also be performed by the circulating medium conduit 11 and 12.

In the modification shown in Fig. 3 a blade impeller 21 is substituted for the cylindrical impeller 7 in which case the funnel member 16 and small baffles 15 may be eliminated without impairing the function of the baffles 18 and 19 which maintain the desired circulation.

By means of the above-described apparatus, the liquid to be evaporated or concentrated is subjected to a vigorous circulating action in heat exchange relation with the walls 10 of the container, which walls should be of a design to not impede the flow of the liquid in its directional movement from the bottom to the top of the evaporating chamber.

Although one embodiment of the invention has been herein illustrated and described, it will be evident to those skilled in the art that various modifications may be made in the details of construction without departing from the principles herein set forth.

I claim:

1. In an evaporator of the kind described, a substantially cylindrical chamber adapted to contain liquid to be evaporated, a plurality of concentric annular heat exchange casings to heat the liquid in the chamber, a hollow cylindrical rotor disposed axially within the innermost casing to agitate said liquid, an annular collar depending inwardly from the upper rim of the innermost casing, and a plurality of radial baffles to support the casing from below and to aid the circulation of the liquid in the chamber by diverting same upward between the outer walls of the casings.

2. In a liquid treating device, a cylindrical housing having a well spaced from the side walls of said housing and a hollow cylindrical rotor in said well extending throughout the greater part of the well and below the same, said well being open at the top and having baffles beneath said opening and above said rotor extending radially from the wall of the well to divert the liquid flow from the outside to the inside of said rotor, and baffles above said well opening for diverting the liquid flow from the outside to the inside of said well.

3. In a liquid treating device, a cylindrical housing having a well spaced from the wall of said housing and a hollow cylindrical rotor in said well extending throughout the greater part of the well and below the same, said well having a constricted opening at the top and having baffles beneath said opening extending radially from the wall of the well above the rotor to divert the liquid flow from the outside to the inside of said rotor within the well, and baffles above said well opening for diverting the liquid flow from the outside to the inside of said well.

4. In a liquid treating device, a cylindrical housing having a well spaced from the wall of said housing and a hollow cylindrical rotor in said well extending throughout the greater part of the well and below the same, heat exchange walls disposed in and around and forming flow passages on both sides of said well having connections with a source of temperature control medium, said walls being arranged to form a passage for the liquid to be treated inside and outside of said well, said well being open at the top and having baffles beneath said opening extending radially from the wall of the well above the rotor to divert the liquid flow from the outside to the inside of said rotor, and baffles above the heat exchange walls for intercepting the rising circular flow of the liquid to be treated and diverting the flow from the outside to the inside of said well.

5. In a liquid treating device, a cylindrical housing having a well spaced from the wall of said housing and a hollow cylindrical rotor in said well extending throughout the greater part of the well and below the same, heat exchange walls disposed in and around and forming flow passages on both sides of said well having connections with a source of temperature control medium, said walls being arranged to form a passage for the liquid to be treated inside and outside of said well, said well being open at the top and having baffles beneath said opening extending radially from the wall of the well above the rotor to divert the liquid flow from the outside to the inside of said rotor, baffles below the heat exchange walls for directing the liquid upwardly through the heat exchange flow passages, and baffles above said heat exchange walls for intercepting the rising circular flow of the liquid to be treated and diverting the flow from the outside to the inside of said well.

6. In a liquid treating device a cylindrical housing having a well spaced from the wall of said housing, heat exchange walls disposed in and around and forming annular flow passages on both sides of said well having connections with a source of temperature control medium, impelling means extending below said well for exhausting the liquid from the well and displacing the same radially outward and upward by circular motion outside of said well, and baffles above said heat exchange walls for intercepting the rising circular flow of the liquid to be treated and diverting the flow radially inward toward the center of said well.

7. In a liquid treating device a cylindrical housing having a well spaced from the wall of said housing, heat exchange walls disposed in and around and forming flow passages on both sides of said well having connections with a source of temperature control medium, impelling means extending below said well for exhausting the liquid from the well and diverting the flow radially outward and upward by circular motion outside of said well, baffles below said heat exchange walls for directing the flow of liquid upward between said walls, and baffles above said heat exchange walls for intercepting the rising circular flow of the liquid to be treated and diverting the flow radially inward toward the center of said well.

BRONISLAW GOLDMAN.

REFERENCES CITED

The following references are of record in the file of this patent:

UNITED STATES PATENTS

| Number | Name | Date |
| --- | --- | --- |
| 134,706 | Schultze | Jan. 7, 1873 |
| 1,309,219 | Ruth, Jr. | July 8, 1919 |
| 574,282 | Sebastian | Dec. 29, 1896 |
| 1,958,939 | Bullock | May 15, 1934 |
| 1,031,666 | Richmond | July 2, 1912 |
| 1,560,826 | Kirschbraum | Nov. 10, 1925 |
| 1,335,398 | Sieck et al. | Mar. 30, 1920 |
| 1,087,409 | Tiemann | Feb. 17, 1914 |
| 1,835,620 | Webre | Dec. 8, 1931 |
| 1,437,698 | Wirth-Frey | Dec. 5, 1922 |
| 1,958,078 | Webre | May 8, 1934 |

FOREIGN PATENTS

| Number | Country | Date |
| --- | --- | --- |
| 655,503 | Germany | 1938 |
| 318 | Austria | 1899 |